United States Patent [19]

Kraft

[11] 4,162,778

[45] Jul. 31, 1979

[54] VIBRATING MACHINE SUSPENSION

[75] Inventor: Robert E. Kraft, Indiana Borough, Pa.

[73] Assignee: FMC Corporation, San Jose, Calif.

[21] Appl. No.: 820,982

[22] Filed: Aug. 1, 1977

[51] Int. Cl.$^2$ .................. F16F 15/00; B65G 27/08
[52] U.S. Cl. ................................ 248/610; 198/760; 198/763
[58] Field of Search ............... 198/760, 761, 763, 764; 248/15, 18, 20, 21, 22, 26

[56] References Cited

U.S. PATENT DOCUMENTS

| | | | |
|---|---|---|---|
| 2,638,206 | 5/1953 | Musschoot et al. | 198/760 |
| 2,678,720 | 5/1954 | Brumagin | 198/760 |
| 2,984,339 | 5/1961 | Musschoot | 198/761 |
| 3,202,282 | 8/1965 | Růžička | 198/764 |
| 3,347,352 | 2/1967 | Gwinn, Jr. | 198/763 |
| 3,583,553 | 6/1971 | Spurlin et al. | 198/763 |
| 3,899,281 | 8/1975 | Jakobs | 248/22 |

FOREIGN PATENT DOCUMENTS

| | | | |
|---|---|---|---|
| 1272615 | 8/1961 | France | 248/22 |
| 925015 | 5/1963 | United Kingdom | 198/764 |

Primary Examiner—Robert B. Reeves
Assistant Examiner—Jeffrey V. Nase
Attorney, Agent, or Firm—J. F. Verhoeven; J. W. Edwards

[57] ABSTRACT

A vibrating machine, such as an oscillating conveyor, vibratory feeder, or vibratory screen, is mounted to a plurality of supports by a suspension that isolates machine vibrations from the supports. The suspension includes a plurality of U-shaped stirrups extending transversely beneath the machine at intervals spaced longitudinally of the machine. Each U-shaped stirrup extends between a pair of opposed supports to which the stirrup is mounted for pivotal movement about an axis of rotation that extends transversely of the vibrating machine. This axis of rotation is along or near the axis of the instantaneous center of rotation of the stirrup. The stirrups support the vibrating machine at surfaces spaced below the axis of rotation. These stirrup surfaces are located to intersect an axis passing through the region of the center of percussion of the stirrup about the axis of rotation. Vibrations in a direction longitudinal of the vibrating machine impart a rotational motion to each stirrup. Thus, such vibrations are not transmitted to the supports. In a preferred embodiment, resilient bushings are fitted within the U-shaped stirrups coaxial with their axis of rotation, and vibration dampening resilient means are provided for mounting the vibrating machine upon the stirrups.

11 Claims, 8 Drawing Figures

U.S. Patent  Jul. 31, 1979  Sheet 1 of 3  4,162,778
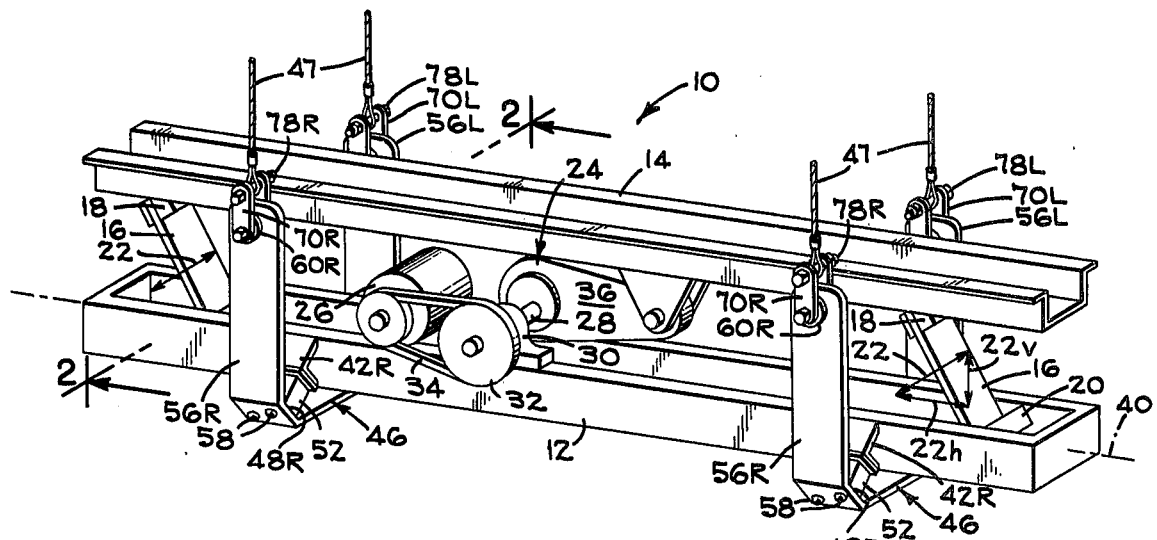
FIG_1
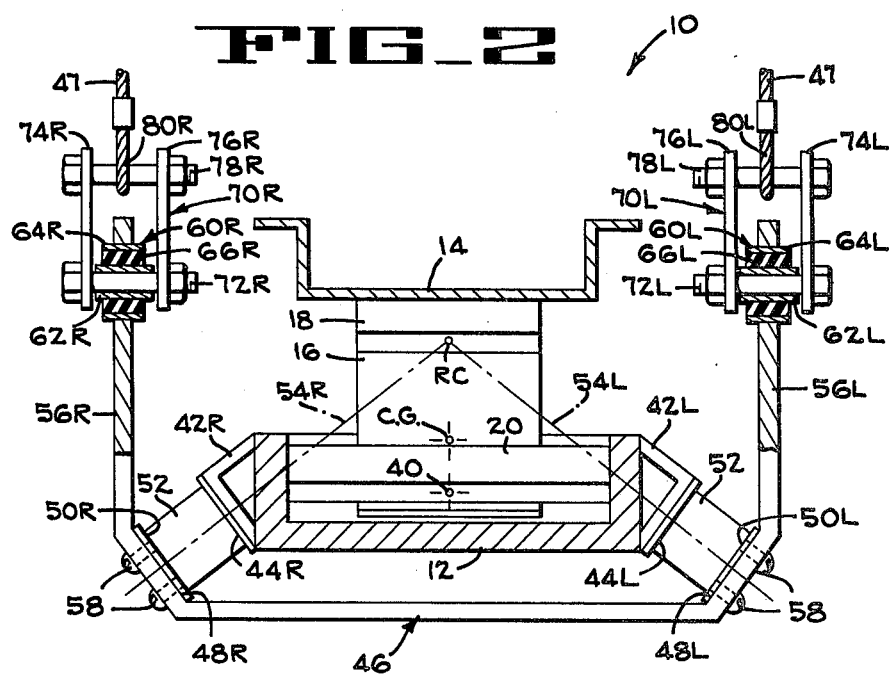
FIG_2

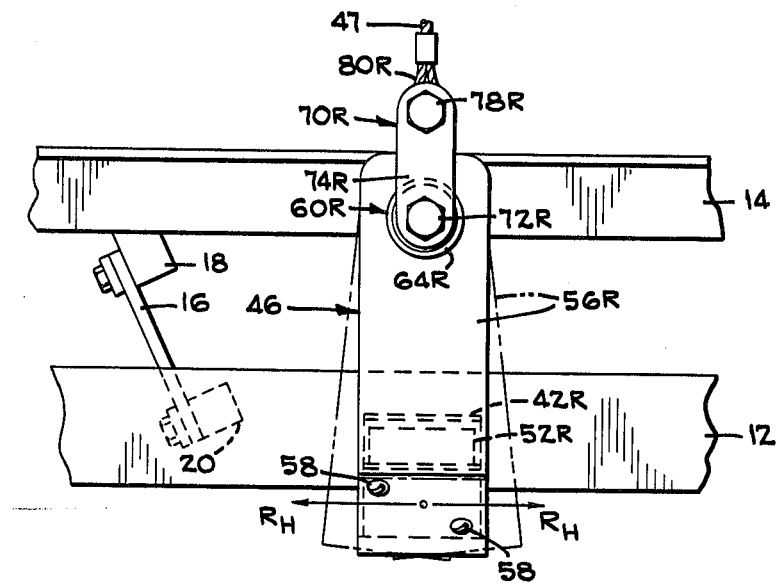
FIG_3
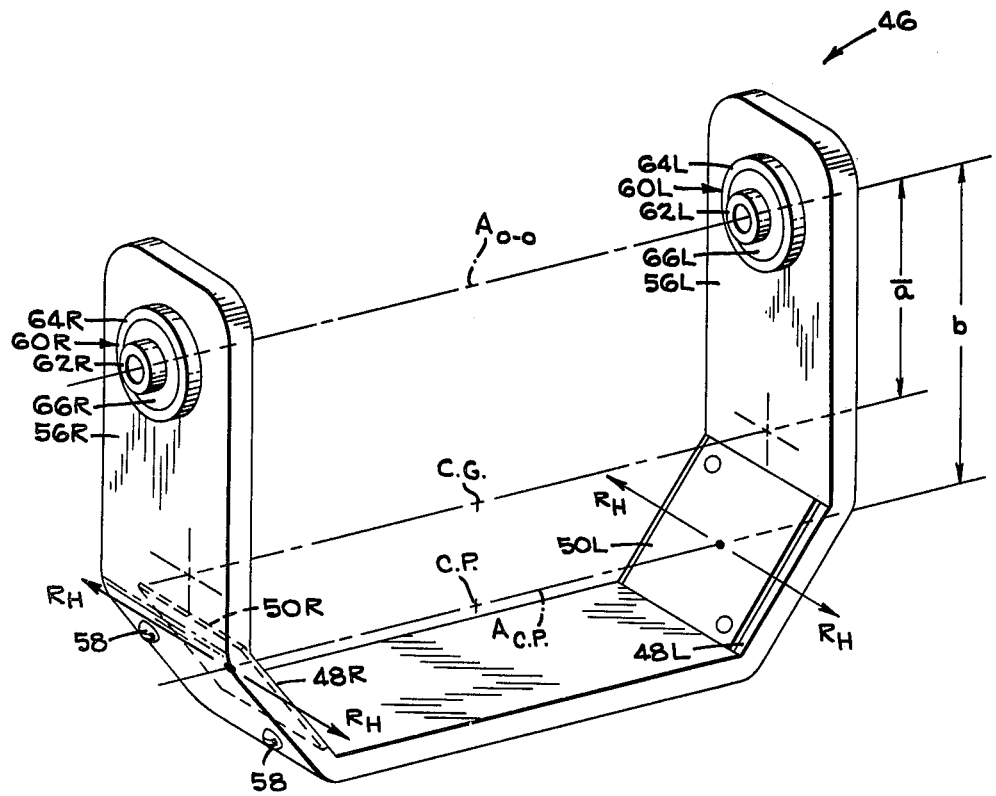
FIG_4

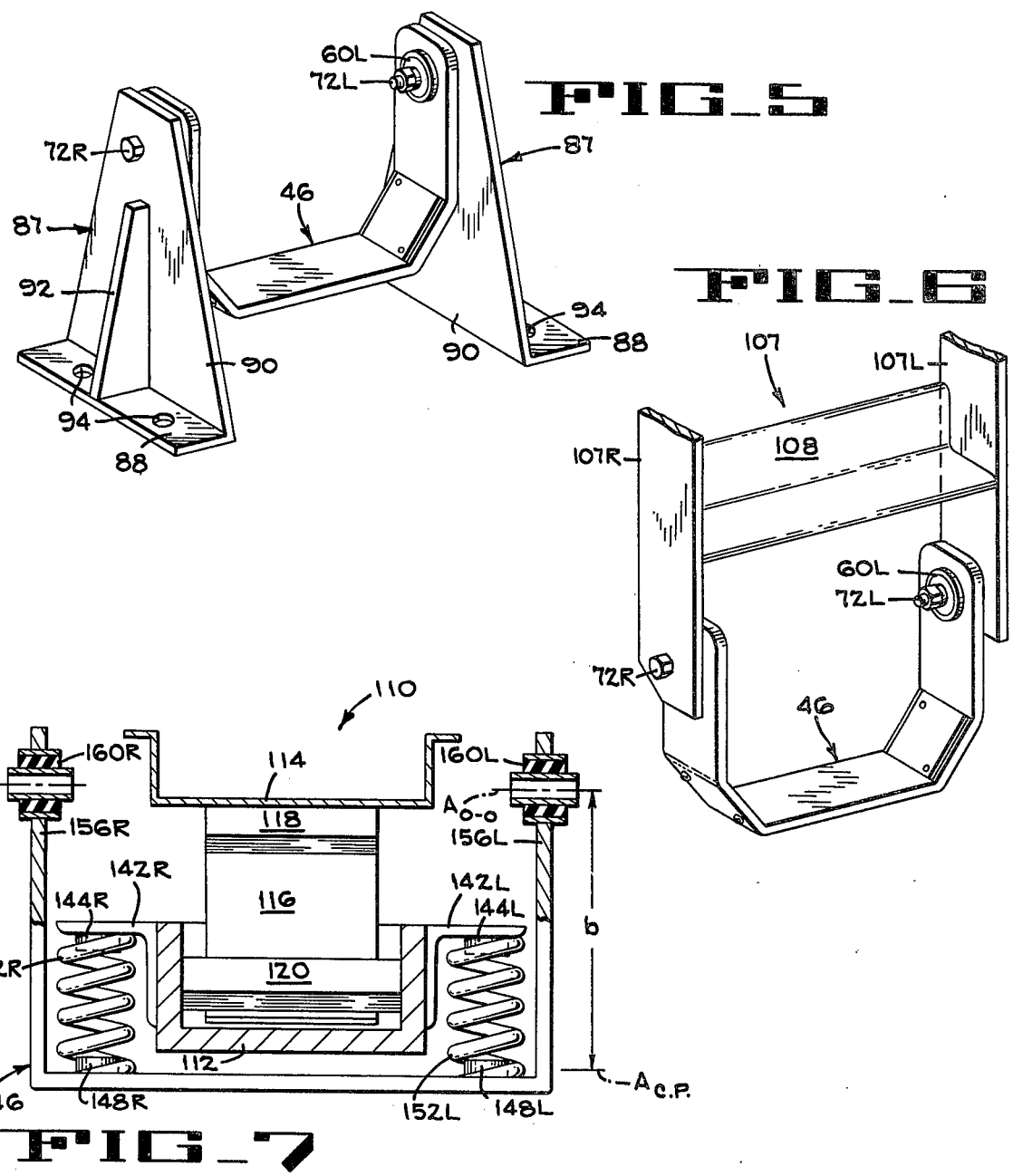

VIBRATING MACHINE SUSPENSION

BACKGROUND OF THE INVENTION

1. Field of the Invention

This invention relates to vibrating machine suspensions of the type that isolate machine vibrations from supports.

2. Description of the Prior Art

The present inventor was the co-inventor of U.S. Pat. application Ser. No. 796,623, filed May 13, 1977, and that application has been assigned to the same assignee as the present application. The prior application discloses a vibratory machine of the type having a base, a working member resiliently mounted on the base, and a drive member connected between the base and the working member. The base is isolated from a support structure by means of elastomeric blocks that are positioned on each side of the vibrating machine. The blocks are inclined laterally with respect to the horizontal and have axes perpendicular to their support surfaces which converge about the center of gravity of the vibrating machine. While such elastomeric blocks isolate a substantial amount of the machine vibrations, some vibrations are transmitted to the supports in a direction longitudinally of the vibrating machine. Such vibrations present problems for supports if the frequency of the vibrations is close to the natural frequency of the supports.

U.S. Pat. No. 3,029,924 of Musschoot, which issued on Apr. 17, 1962, shows a stirrup-like structure supporting a vibratory feeder. An instantaneous center of rotation C is located at a point offset from the pivotal axis 26. Superimposed on the oscillatory movement about the center of rotation C is a translatory movement of the feeder due to a periodic component of force acting on a line that passes from the center of percussion, through the center of gravity and the instantaneous center of rotation. The net effect of the forces applied to the feeder by its exciter is to drive the feeder surface so that any given point thereon follows an elliptical path located in a vertical plane.

U.S. Pat. No. 3,347,352 of Gwinn, which issued on Oct. 17, 1967, discloses a vibratory feeder wherein use is made of the feeder inertia for isolating vibration. A feeder base is supported on a supporting structure by rollers that are arranged between inclined surfaces on the supporting structure and complementary inclined surfaces on the base. The surfaces are in parallel plane relationship with each other, and these surfaces support the base for rotation about the center of rotation on one side of the center of gravity of the feeder. When the feeder is so supported, its center of percussion is on the opposite side of the center of gravity. The center of rotation is chosen so that the lines of action, where vibration of the feeder pass through the feeder base portion, are in the region of the center of percussion. When the vibrations pass through the center of percussion, there is not tangential reaction transmitted to the support structure.

SUMMARY OF THE INVENTION

A suspension mounts a vibrating machine to supports for isolating machine vibrations from supports. The suspension includes a plurality of U-shaped stirrups that extend transversely beneath the machine at intervals spaced longitudinally of the machine. Each stirrup extends between a pair of opposed supports to which the stirrup is mounted for pivotal movement about an axis of rotation that extends transversely of the machine in the region of the stirrups instantaneous center of rotation. Each stirrup has surfaces for supporting the machine at locations spaced below the axis of rotation. These surfaces intersect an axis that is parallel to the axis of rotation and that passes through the region of the center of percussion of the stirrup about the axis of rotation. Thus, machine vibrations in a longitudinal direction of the vibrating machine impart rotational motion to each U-shaped stirrup, and such rotational motion isolates the vibrations from the supports.

BRIEF DESCRIPTION OF THE DRAWINGS

FIG. 1 is a perspective view of a vibrating machine embodying the present invention.

FIG. 2 is a section taken on the line 2—2 of FIG. 1.

FIG. 3 is a side elevation view, of a portion or the vibrating machine shown in FIG. 1, illustrating the pivotal movement of a U-shaped stirrup.

FIG. 4 is a perspective view of a U-shaped stirrup.

FIG. 5 is a perspective view, illustrating a modified form of the invention, wherein the U-shaped stirrup is supported by a floor stand.

FIG. 6 is a perspective view, illustrating another modification of the invention, wherein the U-shaped stirrup is supported by an overhead framework.

FIG. 7 is a transverse section, illustrating another modification of the invention, wherein the vibrating machine base is supported above the U-shaped stirrup by coil springs.

FIG. 8 is a side elevation view of a portion of the vibrating machine shown in FIG. 7.

DESCRIPTION OF THE PREFERRED EMBODIMENTS

There is shown in FIG. 1 a vibrating machine 10 having a base 12 and a work member 14. Although the machine may be any vibrating machine in which a work member is oscillated longitudinally with respect to the base, such as an oscillating conveyor, vibratory feeder or vibratory screen, a material conveyor has been shown for illustrative purposes. The work member is in the form of a trough, which receives material at the left end of the trough, as viewed in FIG. 1, and transports the material to the right end of the trough.

The work member 14 is mounted for movement relative to the base 12 by means of leaf springs 16. One end of each leaf spring is secured by bolting to a mounting block 18 on the work member, while the opposite end of each leaf spring is secured by bolting to a mounting block 20 on the base. The leaf springs, which are inclined slightly from the vertical, define the path of movement of the work member as perpendicular to the inclined leaf springs. Thus, each end of the work member moves in the direction of the arrows 22.

A drive unit 24 is connected between the base 12 and the work member 14. The drive unit includes a motor 26 that is mounted on the base and a crankshaft 28 that is rotatably mounted in bearing blocks 30 which in turn are mounted on the base. The crankshaft 28 is driven by the motor through a pulley 32, secured to the crankshaft, and belt 34. Rotation of crankshaft imparts to the work member a vibratory motion through a crank 36 which is eccentrically mounted on the crankshaft and pivotally connected to the work member 14.

Since the vibratory motion of the work member 14 is in the direction of arrows 22, the work member vibration will have a longitudinal, or horizontal, component 22h and a vertical component 22v. The horizontal and vertical components of the vibratory motion of the work member create reactionary horizontal and vertical components of vibration in the base 12.

The base 12 is elongated and has a U-shaped cross section, as shown in FIG. 2, with a longitudinal centerline 40 extending therethrough. The base is supported on a plurality of U-shaped stirrups 46, each of which are in turn connected to a pair of opposed supports 47, such as suspension cables hanging from an overhead support, not shown. As the vibrating machine 10 oscillates, vibratory reactions create longitudinal and vertical vibrations in the base. These base vibrations can be destructive if not isolated from the supports, particularly if such vibrations are close to the natural frequency of the opposed supports or suspension cables.

As shown in FIGS. 1 and 2, L-shaped brackets 42L and 42R are secured at two or more points along each side, respectively, of the base 12. The lower surfaces 44L and 44R of the brackets define contact surfaces which are inclined to face downwardly and outwardly (away from the centerline 40 of the base). Preferably, the contact surfaces define an angle of approximately 45° from horizontal, although other angles in a range between 30° to 70° can be used.

The U-shaped stirrups 46 have two laterally inclined surfaces 48R, 48L (one for each base bracket 42R, 42L) on opposite sides of the base centerline 40 and longitudinally aligned in registration with the brackets on the base 12, as shown in FIGS. 1 and 2. Each surface 48R, 48L has a mounting plate attached thereto with an upper surface 50R, 50L inclined to face upwardly and inwardly (toward the centerline 40 of the base). These upwardly facing surfaces are parallel, respectively, to the surfaces 44R, 44L of the base brackets 42R, 42L.

An elastomeric block 52 is received between each pair of complementary parallel surfaces 44R-50R, 44L-50L to support the vibrating machine 10 on the U-shaped stirrup 46. The blocks can be fastened to these surfaces by adhesives. Since the elastomeric block is inclined at an angle between the vertical and the horizontal (say, at an angle of 45° to each), the weight of a vertically acting load (such as gravity) causes internal stresses within the block that are partly in compression and partly in shear. In this orientation, the resilient characteristics of the block to vertical forces fall intermediately between stiff and soft, and the stiffness of the block to longitudinal forces is not increased. With reference to FIG. 1, it will be seen that longitudinal vibrations of the base act on the elastomeric blocks in shear so that the blocks remain soft to these forces. Thus, such vibrations are dampened or isolated from the U-shaped stirrups 46.

With reference to FIG. 2, it should be noted that central axes 54L and 54R through the blocks and perpendicular to the faces thereof intersect at a point identified as a roll center RC. These points (which define a roll center axis extending through two or more RC points) constitute roll centers because they are the points about which the elastomeric blocks 52 offer the least resistance to roll. In order to prevent an undesirable roll, the angle of inclination of the blocks should be arranged to assure that the axes 54L and 54R intersect above the center of gravity CG of the vibrating machine 10 (when under normal load) so that the vibrating machine will not have a tendency to tilt.

While the elastomeric blocks 52 substantially dampen the machine vibrations, some reactions may be transmitted through the blocks to the U-shaped stirrups 46, as indicated by the reactions $R_H$ in FIGS. 3 and 4. These vibratory reactions are isolated from the supports 47 by vibratory reactions, as will now be described. Each stirrup is formed from a flat strip of metal having end portions 56R, 56L bent upright in relationship to an intermediate portion of the stirrup. The laterally inclined surfaces 48R, 48L of the stirrup are located at transitions between the intermediate portion and the upright end portions. Openings are provided within surfaces 48R, 48L for screws 58 that fasten thereto the mounting plates with upper surfaces 50R, 50L. Near the distal ends of the upright end portions, there are resilient bushings 60R, 60L fitted within the stirrups in coaxial relationship with an axis of rotation $A_{o-o}$. These resilient bushings include metallic inner sleeves 62R, 62L, metallic outer sleeves 64R, 64L, and resilient intermediate sleeves 66R, 66L. Vertical forces transmitted from the vibrating machine 10 are first reduced by the elastomeric blocks 52 and then by the resilient bushings 60.

With reference to FIG. 4, each U-shaped stirrup 46 has a center of gravity C.G. where its mass can be considered to be concentrated about. The perpendicular distance from the axis of rotation $A_{o-o}$ to a parallel axis passing through the center of gravity is represented by the centroidal distance $\bar{a}$. Each stirrup also has a center of percussion C.P. with respect to the axis of rotation $A_{o-o}$ and may be defined as the point of application of the resultant of all the forces tending to cause the stirrup to rotate about the axis. Impulses can be applied to the stirrup in a direction longitudinally of the vibrating machine, as indicated by the reactions $R_H$, and the resultant of these forces can pass through the center of percussion without causing any pressure on the axis of rotation. Thus, the suspended stirrup isolates vibrations from the axis of rotation.

Each stirrup 46 is dimensioned to position the laterally inclined surfaces 48R, 48L to be intersected at their midpoints by an axis $A_{C.P.}$ passing through the center of percussion C.P. The axis $A_{C.P.}$ is parallel to the axis of rotation $A_{o-o}$ and the perpendicular distance between these axes is represented by the distance b. This distance can be determined by the formula $$b = I_o / \bar{a} M$$

where $I_o$ is the moment of inertia of the stirrup taken about the axis of rotation, $\bar{a}$ is the distance from the center of gravity to the axis of rotation, and M is the mass of the stirrup. When the stirrups are so dimensioned and the resultant force is applied at the center of percussion, the stirrup rotates about the axis of rotation $A_{o-o}$ without applying a reaction pressure towards the axis in a direction longitudinally of the vibrating machine 10. The axis of rotation $A_{o-o}$ is also the axis of the instantaneous center of rotation of the stirrup. The instantaneous center is defined as an imaginary point about which a body having general motion may be considered to be rotating for the instant.

The stirrups 46 are connected to the suspension cable supports 47 by clevis-like connectors 70R, 70L. These connectors include pivot bolts 72R, 72L that fit through the inner sleeves 62R, 62L and the side bars 74R, 74L, 76R, 76L that are mounted on opposite sides of each inner sleeve. At the ends of the side bars opposite from the pivot bolts are connector bolts 78R, 78L that pass through loops 80R, 80L at the ends of the suspension cable supports.

In operation, vibrations from the vibrating machine 10 are substantially dampened by the elastomeric blocks 52. Vertical impulses that are transmitted to the stirrups 46 are further absorbed by the resilient bushings 60R, 60L so that such vibrations are isolated from the pivot bolts 72R, 72L. Impulses $R_H$ acting in a direction longitudinally of the vibrating machine cause the stirrup to pivot about the pivot bolts. Since these impulses are applied so that their resultant passes through the center of percussion of the stirrup, there is no transmittal of horizontal forces to the pivot bolts. Thus, vibrations from the vibrating machine are effectively isolated from the suspension cable supports 47.

With reference to FIG. 5, a modified form of the invention is shown. A stirrup 46, as previously described for supporting the vibrating machine 10, is suspended on pivot bolts 72R, 72L, but these pivot bolts are mounted by a pair of opposed supports 87 in the form of floor stands. Each support has a base 88 and an upright plate 90 that is supported on the base by a buttress plate 92. The pivot bolts fit through openings near the tops of the upright plates, while openings 94 are provided in the base for receiving anchor bolts to fasten the base to a floor.

Another modified form of the invention is shown in FIG. 6. In this form of the invention, a stirrup 46, as previously described for supporting the vibrating machine 10, is suspended on pivot bolts 72R, 72L, but these pivot bolts are mounted by a pair of opposed supports 107R, 107L in the form of an overhead framework 107. These supports are laterally braced by an angle 108. The pivot bolts fit through openings near the bottoms of the supports.

A further modified form of the invention is shown in FIGS. 7 and 8. In this form of the invention a vibrating machine 110 has a base 112 and a work member 114. The work member is mounted for movement relative to the base by leaf springs 116 that are bolted at one end to a mounting block 118 of the work member and that are bolted at the opposite end to a mounting block 120 on the base. The base is elongated and has a U-shaped cross section, as shown in FIG. 7.

Angle brackets 142R, 142L are secured at two or more points along each side, respectively, of the base 112. One leg of each bracket depends parallel in abutting relationship with a side of the base, while the opposite leg projects outward horizontally from the base. Bosses 144R, 144L project downwardly from the under surfaces of the outwardly projecting legs. These bosses provide lateral support for the upper ends of coil springs 152R, 152L that are positioned vertically therebelow. The lower ends of these coil springs are supported upon a U-shaped stirrup 146 that has bosses 148R, 148L projecting upwardly to provide lateral support for the lower ends of the coil springs.

The U-shaped stirrups 146 are somewhat similar to the previously described stirrups 46. The stirrup differences being that the stirrups 146 have right angle bends at the corners between the intermediate portion and upright legs 156R, 156L; bosses 148R, 148L project upwardly from the upper surface of the intermediate portion; and the stirrup is dimensioned so that the axis passing through the center of percussion $A_{C.P.}$ is near the upper surface of the intermediate portion. The reactions $R_H$ from the coil springs 152R, 152L would be applied to the stirrup on the axis passing through the center of percussion.

Each stirrup has resilient bushings 160R, 160L, similar to the resilient bushings previously described, fitted within the upright legs in coaxial relationship with the axis of rotation $A_{o-o}$. These stirrups can be suspended from opposed supports, not shown. Such supports can be similar to the suspension cables 47, the floor stands 87, and the overhead framework 107. Operation of the coil springs 152R, 152L, the resilient bushings 160R, 160L, and the stirrups 146 for isolating vibrations is substantially similar to the operation previously described for the suspension of the vibrating machine 110.

From the foregoing description it will be seen that machine vibrations are isolated from supports by a suspension that includes a plurality of U-shaped stirrups for supporting the vibrating machine. These stirrups are pivotally mounted about axis extending transversely of the vibrating machine and the stirrups are spaced longitudinal of the vibrating machine. The stirrups are dimensioned to position the vibrating machine support surfaces so that resultant vibrations pass through the center of percussion of the stirrup about its axis of rotation. The vibrating machine is supported above the stirrup by resilient means, such as elastomeric blocks or coil springs, which dampen vibrations from the vibrating machine.

Although the best mode contemplated for carrying out the present invention has been herein shown and described, it will be apparent that modification and variation may be made without departing from what is regarded to be the subject matter of the invention.

What is claimed is:

1. A suspension for mounting a vibrating machine to supports, said suspension comprising a plurality of U-shaped stirrups that are spaced longitudinally of the machine, each stirrup extending transversely of the machine between opposed supports, each stirrup being mounted for pivotal movement about its own axis of rotation that extends transversely of the machine, each stirrup having a center of percussion in relationship to the axis of rotation of the individual stirrup, each stirrup having surfaces at locations spaced below its axis of rotation, said surfaces being located to intersect an axis that extends parallel to the axis of rotation and that passes through the center of percussion of the stirrup, said surfaces providing support for the machine so that vibrational forces in a direction longitudinally of the machine are applied to the stirrup with the resultant of such forces being located at the center of percussion of the stirrup, whereby such forces impart rotational motion to each individual stirrup about its own axis of rotation without causing a reactive pressure on the supports adjacent the axis of rotation in a direction longitudinally of the machine, each U-shaped stirrup having a center of gravity that is spaced perpendicularly from the axis of rotation of the stirrup, said machine supporting surfaces being located to intersect a plane wherein the axis of rotation and the center of gravity of the stirrup are contained, said surfaces being located on the side of the center of gravity opposite from the axis of rotation, the perpendicular distance between the axis of rotation and the axis passing through the center of percussion being equal to $I_o/\bar{a} M$ where $I_o$ is the amount of inertia of the stirrup taken about the axis of rotation, $\bar{a}$ is the distance from the center of gravity to the axis of rotation, and M is the mass of the stirrup.

2. The suspension described in claim 1 wherein each U-shaped stirrup has a pair of resilient bushings fitted therein coaxially with the axis of rotation.

3. The suspension described in claim 2 including vibration dampening resilient means mounted upon the surfaces for supporting the vibrating machine.

4. The suspension described in claim 1 including vibration dampening resilient means mounted upon the surfaces for supporting the vibrating machine.

5. The suspension described in claim 4 wherein said vibration dampening resilient means includes coil springs.

6. The suspension described in claim 1 wherein said vibration dampening resilient means includes elastomeric blocks.

7. The suspension described in claim 6 wherein said elastomeric blocks are mounted on the U-shaped stirrup on each side of the longitudinal centerline of the vibrating machine, said vibrating machine has on each side of said centerline surfaces which face downwardly and outwardly, said U-shaped stirrups having support surfaces which face upwardly and inwardly, said elastomeric blocks having support surfaces in parallel relation between the downwardly and outwardly facing surfaces on the vibrating machine and the upwardly and inwardly facing surfaces on the stirrups for supporting engagement therebetween.

8. A suspension as described in claim 6 wherein the opposed supports to which the stirrups are mounted are an overhead framework.

9. A suspension as described in claim 1 wherein the opposed supports to which the stirrups are mounted are floor stands.

10. A suspension as described in claim 1 wherein the opposed supports to which the stirrups are mounted include suspension cables.

11. A suspension for mounting a vibrating machine to supports, said suspension comprising a plurality of U-shaped stirrups that are spaced longitudinally of the machine, each stirrup extending transversely of the machine between opposed supports, each stirrup being mounted for pivotal movement about its own axis of rotation that extends transversely of the machine, each stirrup having a center of percussion in relationship to the axis of rotation of the individual stirrup, each stirrup having a pair of surfaces adjacent the sides of the stirrup and at locations spaced below its axis of rotation, said surfaces being located to intersect an axis that extends parallel to the axis of rotation and that passes through the center of percussion of the stirrup, vibration dampening resilient means mounted to said surfaces for supporting the machine so that vibrational forces in a direction longitudinally of the machine are applied through the resilient means to the stirrup with the resultant of such forces being located at the center of percussion of the stirrup, whereby such forces impart rotational motion to each individual stirrup about its axis of rotation without causing a reactive pressure on the supports adjacent the axis of rotation in a direction longitudinally of the machine, said axis of rotation of each stirrup being in the region of the respective stirrup's instantaneous center of rotation.

* * * * *

UNITED STATES PATENT OFFICE
CERTIFICATE OF CORRECTION

Patent No. 4,162,778　　　　　　　　Dated　July 31, 1979

Inventor(s)　Robert E. KRAFT

It is certified that error appears in the above-identified patent and that said Letters Patent are hereby corrected as shown below:

Col. 1, line 59, change "not" to --no--.
Col. 2, line 18, change "or" to --of--.
Col. 6, line 65, change "amount" to --moment--.

Signed and Sealed this

Eighteenth Day of March 1980

[SEAL]

Attest:

SIDNEY A. DIAMOND

Attesting Officer　　　Commissioner of Patents and Trademarks